(12) United States Patent
Parmar et al.

(10) Patent No.: US 7,809,369 B2
(45) Date of Patent: Oct. 5, 2010

(54) ADAPTIVE TESTING OF SYSTEM ACQUISITION AND ROAMING CHARACTERISTICS FOR CDMA WIRELESS COMMUNICATION SYSTEMS

(75) Inventors: Ramesh Parmar, Union, NJ (US); Bennett Lass, Union, NJ (US); Dinesh Doshi, Union, NJ (US)

(73) Assignee: w2bi, Inc., Union, NJ (US)

( * ) Notice: Subject to any disclaimer, the term of this patent is extended or adjusted under 35 U.S.C. 154(b) by 1088 days.

(21) Appl. No.: 11/446,451

(22) Filed: Jun. 2, 2006

(65) Prior Publication Data

US 2007/0281684 A1    Dec. 6, 2007

(51) Int. Cl.
*H04W 24/00* (2009.01)

(52) U.S. Cl. .................. 455/424; 455/418; 455/423; 455/432.1; 370/241; 370/242; 370/248; 370/249; 370/250

(58) Field of Classification Search ......... 455/418–420, 455/423–425, 432.1; 370/241, 242, 248, 370/249, 250, 252
See application file for complete search history.

(56) References Cited

U.S. PATENT DOCUMENTS

| | | | |
|---|---|---|---|
| 5,995,829 | A | 11/1999 | Broderick |
| 5,999,521 | A | 12/1999 | Thompson |
| 6,047,071 | A | 4/2000 | Shah |
| 6,144,849 | A | 11/2000 | Nodoushani et al. |
| 6,148,197 | A | 11/2000 | Bridges et al. |
| 6,201,964 | B1 | 3/2001 | Tung et al. |
| 6,378,088 | B1 | 4/2002 | Mongan |
| 6,516,188 | B1 | 2/2003 | New et al. |
| 6,564,055 | B1 | 5/2003 | Hronek |
| 6,615,038 | B1 | 9/2003 | Moles et al. |
| 6,625,451 | B1 | 9/2003 | La Medica, Jr. et al. |
| 6,684,359 | B2 | 1/2004 | Noy |
| 6,907,546 | B1 | 6/2005 | Haswell et al. |
| 6,925,405 | B2 | 8/2005 | Adir et al. |
| 6,959,433 | B1 | 10/2005 | Morales, Jr. et al. |
| 6,970,719 | B1 * | 11/2005 | McConnell et al. ...... 455/554.1 |
| 7,032,212 | B2 | 4/2006 | Amir et al. |

(Continued)

*Primary Examiner*—Stephen M D'Agosta
(74) *Attorney, Agent, or Firm*—McHale & Slavin, P.A.

(57) ABSTRACT

The present invention discloses an automated testing solution for PRL's, System Acquisition algorithm, and CDMA device performance. A testing plan loads a specific PRL into a test device, reads and categorizes the entries in the PRL file, and then uses the information to set the parameters on the emulation hardware needed for each test case. The testing solution allows an operator to specify the PRL file to be used for testing and the testing plan will determine the relationships between different PRL entries in the test file including the System of equal priority in the same GEO, System of lesser priority in the same GEO, System of higher priority in the same GEO, Systems in different GEO, and Collocated EVDO systems. Once the entries are categorized the test script will then select the entries need to create the required test conditions on the base station emulation hardware. The test suite employs base station emulation hardware to create the RF conditions stipulated in the test case. The exact RF conditions will be based on the entries in the test PRL. Once all the system parameter information is extracted from the PRL file and all the combinations of systems is created as per the requirements of each test case, the test is executed, with the automation scripts setting the parameters on the BSE and managing the test device as it is programmatically controlled through the test procedures.

5 Claims, 3 Drawing Sheets

U.S. PATENT DOCUMENTS

| | | | |
|---|---|---|---|
| 7,194,264 B2 * | 3/2007 | Li et al. | 455/432.1 |
| 7,286,802 B2 * | 10/2007 | Beyme et al. | 455/67.14 |
| 2003/0156549 A1 | 8/2003 | Binder et al. | |
| 2005/0227688 A1 | 10/2005 | Li et al. | |

* cited by examiner

FIG. 1A

| | QPST Roaming List Editor- | | | | | | | | | | | | | | |
|---|---|---|---|---|---|---|---|---|---|---|---|---|---|---|---|
| File View Window Help | | | | | | | | | | | | | | | |

Properties
Roaming List Type: IS-683C   Default Roaming Indicator: 71
Preferred Only: ☐          Preferred Roaming List ID: ☐

Acquisition Records

| Index | Acquisition Type | Channel 1 | Channel 2 | Channel 3 | Channel 4 | Channel 5 | Channel 6 | Channel 7 | Channel 8 | Channel 9 | Channel 10 | Channel 11 | Channel 12 |
|---|---|---|---|---|---|---|---|---|---|---|---|---|---|
| 0 | CDMA Cellular (custom) | 384 | 777 | 1013 | 356 | 779 | | | | | | | |
| 1 | CDMA Cellular (preferred) | A | | | | | | | | | | | |
| 2 | Analog Cellular | B | | | | | | | | | | | |
| 3 | Analog Cellular | A | | | | | | | | | | | |
| 4 | CDMA Cellular (standard) | B | Both | | | | | | | | | | |
| 5 | CDMA Cellular (standard) | A | Both | | | | | | | | | | |
| 6 | CDMA PCS (channels) | 425 | 450 | 625 | | | | | | | | | |
| 7 | CDMA PCS (channels) | 675 | 150 | 425 | | | | | | | | | |

System Records

| Index | System Type | Neg/Pref | Geography | Priority | Acq Index | Roam Indicator | Assn Incl | Assn Tag | PN Assn | Data Assn | Subnet ID | NID |
|---|---|---|---|---|---|---|---|---|---|---|---|---|
| 0 | IS-856 | Pref | New | Same | 38 | 68 | Yes | 0 | No | No | /0 | |
| 1 | IS-856 | Pref | Same | Same | 40 | 73 | Yes | 1 | No | No | /0 | |
| 2 | IS-856 | Pref | Same | More | 42 | 66 | Yes | 1 | No | No | /0 | |
| 3 | IS-856 | Pref | Same | Same | 39 | 64 | Yes | 2 | No | No | /0 | |
| 4 | IS-856 | Pref | Same | More | 41 | 72 | Yes | 2 | No | No | /0 | |
| 5 | IS-856 | Pref | Same | Same | 39 | 75 | Yes | 2 | No | No | /0 | |
| 6 | IS-856 | Pref | Same | Same | 43 | 74 | Yes | 3 | No | No | /0 | |

TO FIGURE 1B

FROM FIGURE 1A

| | | | | | | | | | | | | |
|---|---|---|---|---|---|---|---|---|---|---|---|---|
| 7 | IS-856 | Pref | Same | Same | 41 | 66 | Yes | 4 | No | No | /0 | |
| 8 | IS-856 | Neg | Same | Same | 44 | 0 | Yes | 5 | No | No | /0 | |
| 9 | 95(A,B)/1x | Pref | Same | Same | 9 | 64 | No | 0 | No | No | 8 | 65535 |
| 10 | 95(A,B)/1x | Pref | Same | Same | 9 | 0 | No | 0 | No | No | 250 | 65535 |
| 11 | 95(A,B)/1x | Pref | Same | Same | 9 | 2 | No | 0 | No | No | 56 | 65535 |
| 12 | 95(A,B)/1x | Pref | Same | Same | 9 | 64 | Yes | 0 | No | No | 18 | 65535 |
| 13 | 95(A,B)/1x | Pref | Same | Same | 1 | 64 | No | 1 | No | No | 119 | 65535 |
| 14 | 95(A,B)/1x | Pref | Same | Same | 0 | 1 | Yes | 0 | No | No | 28 | 65535 |
| 15 | 95(A,B)/1x | Pref | Same | Same | 0 | 65 | No | 0 | No | No | 482 | 65535 |
| 16 | 95(A,B)/1x | Pref | Same | Same | 0 | 64 | Yes | 2 | No | No | 8 | 65535 |
| 17 | 95(A,B)/1x | Pref | Same | Same | 0 | 0 | No | 0 | No | No | 250 | 65535 |
| 18 | 95(A,B)/1x | Pref | Same | Same | 0 | 64 | No | 1 | No | No | 56 | 65535 |
| 19 | 95(A,B)/1x | Pref | Same | Same | 37 | 64 | Yes | 1 | No | No | 18 | 65535 |
| 20 | 95(A,B)/1x | Pref | Same | More | 0 | 64 | Yes | 4 | No | No | 18 | 65535 |
| 21 | 95(A,B)/1x | Pref | Same | Same | 36 | 66 | Yes | 0 | No | No | 4405 | 65535 |
| 22 | 95(A,B)/1x | Pref | Same | More | 31 | 66 | No | 0 | No | No | 4107 | 65535 |
| 23 | 95(A,B)/1x | Pref | Same | Same | 33 | 67 | No | 0 | No | No | 4406 | 65535 |
| 24 | 95(A,B)/1x | Pref | Same | More | 31 | 67 | No | 0 | No | No | 4171 | 65535 |
| 25 | 95(A,B)/1x | Pref | Same | More | 33 | 68 | Yes | 0 | No | No | 4407 | 65535 |
| 26 | 95(A,B)/1x | Pref | Same | More | 37 | 69 | Yes | 1 | No | No | 4408 | 65535 |
| 27 | 95(A,B)/1x | Pref | Same | More | 37 | 70 | No | 0 | No | No | 4409 | 65535 |
| 28 | 95(A,B)/1x | Pref | Same | More | 37 | 2 | Yes | 2 | No | No | 4410 | 65535 |
| 29 | 95(A,B)/1x | Pref | Same | Same | 37 | 0 | Yes | 2 | No | No | 4610 | 65535 |
| 30 | 95(A,B)/1x | Neg | Same | Same | 37 | 0 | No | 0 | No | No | 4510 | 65535 |
| 31 | 95(A,B)/1x | Pref | Same | More | 37 | 2 | No | | No | No | 4411 | 65535 |

ADAPTIVE TESTING OF SYSTEM ACQUISITION AND ROAMING CHARACTERISTICS FOR CDMA WIRELESS COMMUNICATION SYSTEMS

FIELD OF THE INVENTION

The present invention is directed generally to mobile telephone systems. More particularly, the present invention relates to automated testing for CDMA devices and Preferred Roaming Lists (PRL).

BACKGROUND OF THE INVENTION

Under normal operating conditions CDMA devices, (Code Division Multiple Access)—(e.g. AMPS, IS 95, 1×CDMA, EV-DO, and so forth) can see multiple CDMA carrier signals in a given geographic region. While all such RF systems are equal in their capability to provide call processing and data service to the wireless device, that are not equal in the costs associated with the services they provide. In particular, carriers negotiate roaming agreements so that users can utilize the systems with the most favorable rates and carriers do not have the burden of building out the network in all areas. The problem of which this invention addresses, is the current inability of manufacturers and carriers to test various conditions that a mobile operator will encounter when roaming.

When a mobile or cellular telephone is moved outside of its base area, the telephone is switched from the base area system to an alternate system provider so that service can continue for the user. This is commonly referred to as Roaming. To successfully roam, CDMA devices use a Preferred Roaming List (PRL) to determine which wireless system to register. The roaming list provides information such as: System Type; Negative or Preferred System; Geo Information; Priority; Acquisition Index; Roam Indicator; System ID (SID); Network ID (NID); Association Inclusion; Association Tag; Pilot Number Association; Data Association and Subnet ID. Based on this information and the system acquisition algorithm, the CDMA device determines which system it should acquire and use for service.

In order to switch the user to an alternate system provider, the mobile telephone will access system records in the PRL stored in the memory of the mobile phone. Based on the system records stored in the PRL, the mobile phone will typically select an alternative system service provider that will be used to continue service for the user and, based on this selection and the associated information stored in the PRL system records, the mobile phone will automatically access the selected service provider on behalf of the user.

While mobile and cellular telephones have enabled the operators of the phones to roam over large geographic areas while maintaining immediate access to telephony services, the current ability to test the roaming selection is expensive, inaccurrate, and many times results in irate customers who discover a problem. Mobile stations comprising cellular telephones or wireless handsets are operable in cooperation with cellular or Personal Communications Services (PCS) communications systems. Cellular communication systems (wireless carriers) typically provide service to a geographic market area by dividing the area into many smaller areas or cells. Each cell is serviced by a radio transceiver (i.e., a transmitter-receiver base station or cell site). The cell sites or base stations may be connected to Mobile Telephone Switching Offices (MTSOs) or Mobile Switching Centers (MSCs) through landlines or other communication links, and the MTSOs may, in turn, be connected via landlines to the Public Switched Telephone Network (PSTN).

The PRL is stored in the mobile phone's non-volatile memory and, during system initialization, the entire PRL is moved and stored in the unit's RAM for later access during a System Selection and Preferred Roaming operation. Any given market area may be serviced by competing service providers of cellular air time communication services. The competing wireless carriers are assigned different groups of frequencies through which services are provided. A frequency set typically includes control channels and voice channels. The control channels are used for preliminary communications between a mobile station and a cell site for setting up a call, after which a voice channel is assigned for the mobile station's use on that call. The assigned frequency sets are generally referred to as "A band frequencies" and "B band frequencies". Typically, the A band frequencies are reserved for non-wireline service providers, while the B band frequencies are reserved for the incumbent wireline service providers. While each frequency set for a given cellular service market area is assigned to only one service provider, in different market areas the same frequency set may be assigned to different service providers or companies.

Depending upon which wireless carrier the user of the mobile station subscribes to, the home frequency set of the user may correspond to the A frequency band or the B frequency band. Whenever a call is placed by the mobile station, the unit will ordinarily attempt to use the home frequency set to establish the call. If a call is handled outside of the user's home market area, then the unit is said to be "roaming" and service will be attempted through a frequency set of a non-home service provider. Typically, the user's home service provider will have a roaming agreement or reciprocal billing arrangement with the non-home service provider to permit service to be extended to the user's mobile unit when it is roaming in the non-home service provider's market area. Due to the imposition of surcharges, the airtime charges when the mobile station is roaming are customarily higher than when it is operating within its base network.

Operation under a roaming condition is often under the control of the mobile station user. The user can select whether the mobile station will operate in a Base System Only, A Band Only, B Band Only, A Band Preferred, or B Band Preferred operating mode. The user typically controls the system preference and mode operation through menu choice or selection. This current method of roaming control is conventionally known as "Preferred System Selection". In the most common roaming situation, the mobile station remains on the same band as the home cellular network. That is, if the mobile station is homed to a cellular network with an odd numbered SID (which is normally assigned to an A band cellular service provider), then the mobile station will obtain service from the A band cellular service provider when roaming.

Moreover, some large companies have come to depend upon the use of mobile stations and wireless communications. As a result of the large volume of such usage, they have set up corporate accounts with wireless carriers. These accounts are referred to by the wireless carriers as National Accounts. Preferred roaming rates may be negotiated for a National Account with particular wireless carriers in certain geographic market areas. Thus, when a mobile station roams to one of these market areas, the National Account subscriber may prefer a different wireless carrier from the carrier preferred by the mass market. Furthermore, a corporation may require its personnel to subscribe to particular advanced services, e.g., a messaging service so the personnel is always reachable. Conventional mobile station equipment and systems do not permit a corporation to control which carrier roaming personnel will use in order to obtain beneficial rates and to receive selected required advanced services.

It is clear that a device's ability to acquire the proper system is paramount not only for user satisfaction, but also for the carrier to provide the most cost effective service. Thus, proper testing of system acquisition and section of the PRL order is of utmost importance. Accordingly, a need remains for testing of new phone, mobile stations and PRL.

SUMMARY OF THE INVENTION

The present invention satisfies this need through provision of an automated testing solution. System acquisition of the instant invention is based on testing the PRL, the System Acquisition algorithm, and the device performance. The PRL file contains all the information that the roaming algorithm needs to select the correct system from the available ones. For this reason, a generic test plan can be created that will load a specific PRL into a test device, read and categorize the entries in the PRL file and then use the information to set the parameters on the emulation hardware needed for each test case. The Generic System Acquisition test suite will use base station emulation (BSE) hardware to create the required RF conditions of each test scenario. The settings will be taken directly from the test PRL file.

The generic system determination test suite allows the user to specify the PRL file to be used for testing. The test suite will determine the relationships between different PRL entries in the test file including the System of equal priority in the same GEO, System of lesser priority in the same GEO, System of higher priority in the same GEO, Systems in different GEO, and Collocated EVDO systems. Once the entries are categorized the test script will then select the entries need to create the required test conditions on the base station emulation hardware. The Generic System Acquisition test plan has a number of scenarios which need to be testing for both 1X and 1xEV-DO based devices. 1xEV-DO is a "3G" CDMA standard, EV-DO stands for Evolution, Data-Only. Unlike other 1x standards, EV-DO only addresses data-not voice. It requires a dedicated slice of spectrum, separate from voice networks using standards such as 1xRTT. There are currently two main versions of 1xEV-DO; Release 0 and Revision A. Release 0 is the original version and widely deployed. Revision A integrates most of the faster data technology of 1xEV-DO Revision D, and improves latency. This allows features such as VoIP and video calling.

When the test is executed, the user will select the areas to be tested through the applications GUI. Based on the select, the application will control the required number of emulators and set the needed RF conditions. The test suite employs base station emulation hardware to create the RF conditions stipulated in the test case. The exact RF conditions will be based on the entries in the test PRL. Once all the system parameter information is extracted from the PRL file and all the combinations of systems is created as per the requirements of each test case, the test is executed, with the automation scripts setting the parameters on the BSE and managing the test device as it is programmatically controlled through the test procedures.

An objective of the invention is to test a CDMA device specific to a PRL file.

Another objective of the invention is to test a PRL file to a CDMA device.

Another objective of the invention is to have a test that can determine the step of determining the relationship between different PRL entries, said relationship classified as being, of equal priority, lesser priority, higher priority in the same geographical area.

Still another objective of the invention is to provide an automated testing solution that can load a specific PRL into a test device, read and categorize the entries in the PRL file and then use the information to set the parameters on the emulation hardware needed for each test case.

Another objective of the invention is use base station emulation hardware to create the required RF conditions for each test scenario.

Yet still another objective of the invention is take the setting directly from the test PRL file to create the required RF conditions.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto System acquisition testing of the instant invention centers on the testing the Preferred Roaming List (PRL), System Acquisition algorithm, and device performance. Of these three areas, the central part is the PRL file. This file contains all the information that the algorithm needs to select the correct system from the available ones. Because carriers provide services in varying geographic regions e.g. US, Brazil, Korea, etc, each carrier creates its own PRL file that reflects the systems used by their customers. Thus any test solution must be able to use a PRL file specific to the carrier and device type e.g. 1X or 1xEV-DO device type, or hybrid devices which do both 1X and EV-DO.

Although the specific entry in a PRL will vary from carrier to carrier, the format of the entry is specific to the PRL type. The Telephone Industry Association/Electronics Industry Association (TIA/EIA) has a standard that describes a data format to be used for system table records in a PRL entitled "Over-The-Air Service Programming Of Mobile Stations in Spread Spectrum Systems", ("IS-683-A Standard"), the contents of which is hereby incorporated by reference in its entirety. The IS-683-A Standard provides that each system record in the PRL will have the following eight fields:

1. SID field: a 15 bit field that includes a numerical value that is the System Identification number of the system associated with the system record;

2. NID_INCL field: a 2 bit field, the least significant bit of this field indicates whether there is a Network Identification (NID) number associated with the system record and stored in the NID field described below; the most significant bit of this record is used to specify an assumed value for the NID if no value is stored in the NID field described below; the value 11 is a reserved value;

3. NID field a 16 bit field that contains a numerical value that is the Network Identification number of the system associated with the system record;

4. PREF_NEG field: a 1 bit field indicating whether the system associated with the system record is a preferred system or a negative system.

5. GEO field: a 1 bit field that indicates whether the system associated with the system record is within the geographic region of the previous system record in the PRL (if GEO=1) or, alternatively, whether the system is in a new geographic region (if GEO=0);

6. PRI field: a 1 bit field that indicates whether the current system record has a higher priority than that of the next system record in the PRL. This field is omitted from the system record if the PREF_NEG field indicates that the system associated with system record is a negative system;

7. ACQ_INDEX field: a 9 bit field that contains an index to the acquisition parameters required for the mobile phone to access the system associated with the system record;

8. ROAM_IND field: an 8 bit field that indicates the roaming status of the associated system record; this field is omitted from the system record if the PREF_NEG field indicates that the system associated with system record is a negative system.

The PRL is stored in the mobile phone's non-volatile memory and, during system initialization, the entire PRL is moved and stored in the unit's RAM for later access during a System Selection and Preferred Roaming operation. Thus, a generic test plan can be created that will load a specific PRL into the test device, read and categorize the entries in the file and then use the information to set the parameters on the emulation hardware needed for each test case. The Generic System Acquisition test suite will use base station emulation (BSE) hardware to create the required RF conditions of each test scenario. The settings will be taken directly from the test PRL file. The following is a step by step example of adaptive testing of system acquisition and roaming characteristics for CDMA wireless communication systems.

Step 1: PRL Format

The generic system determination test suite will work with IS683A, IS683C and IS683D formatted PRL files. The user will specify the PRL file to be used for testing and the application will automatically load it into the device being tested. It is recognized that while the stated PRL files are current format, the automated testing program of the instant invention is readily adapted to any future changes in the PRL file formatting.

Step 2: Entry Categorizations

Based on the PRL entry, the automated system determination test suite will determine the relationships between different PRL entries in the test file. This includes:

System of equal priority in the same GEO
System of lesser priority in the same GEO
System of higher priority in the same GEO
Systems in different GEO
Collocated EVDO systems Once the entries are categorized the test script will then select the entries need to create the required test conditions on the base station emulation hardware.

Step 3: Selecting the Test Scenario

The Generic System Acquisition test plan has a number of scenarios which need to be testing for both 1X and 1xEV-DO based devices. The next section, Test Scenarios, provides a full detail of all the test scenarios which will be included in the product. When the test is executed, the user will select the areas to be tested through the applications GUI. Based on the select, the application will control the required number of emulators and set the needed RF conditions.

Step 4: Base Station Emulation Settings

Figure 1A:
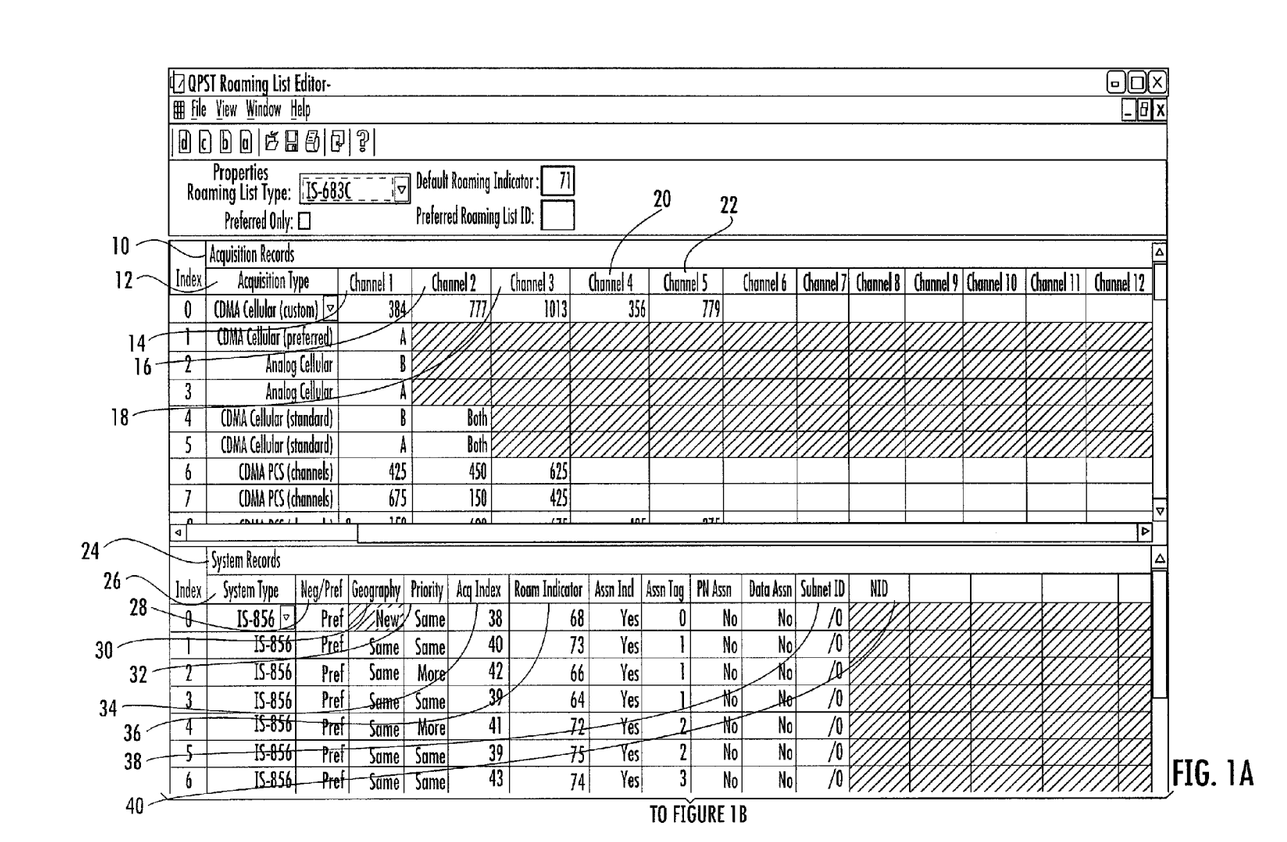
FIG. 1 shows the entries in a typical PRL file.
Figure 1B:
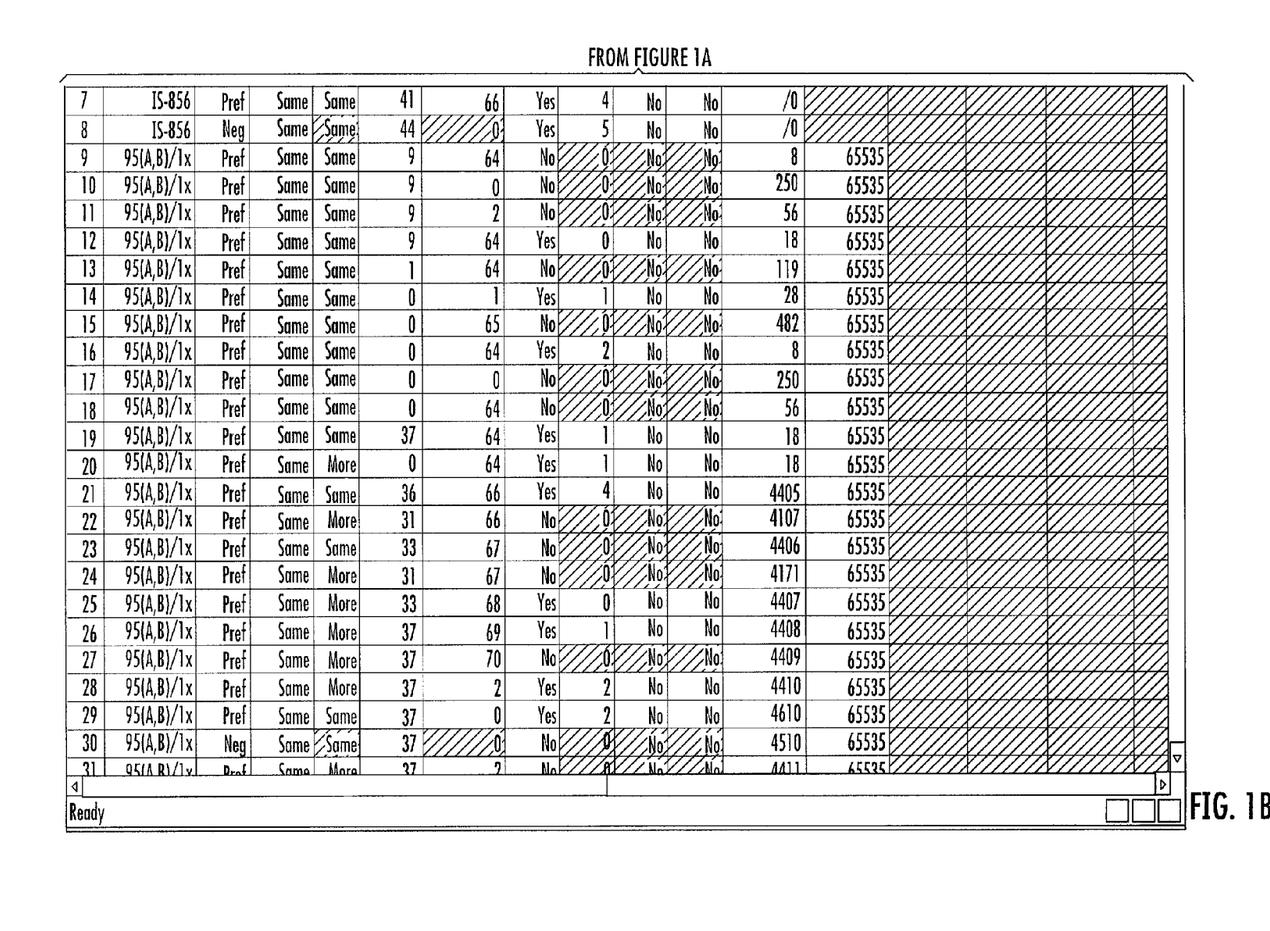

The test suite will use base station emulation hardware to create the RF conditions stipulated in the test case. The exact RF conditions will be based on the entries in the test PRL. FIG. 1 illustrates the entries in a typical PRL file. Acquisition Records include Acquisition type column 12, System type 14, Channel-2 16, Channel-3 18, Channel-4 20, Channel-5 22 and so forth. System Records 24 include column listing of System type 26, Negative/Preferred 28, Geography 30, Priority 32, Acquisition index 34, Roam indicator 36, SID 38 and NID 40.

Step 5: Execution

Once all the system parameter information is extracted from the PRL file and all the combinations of systems is created as per the requirements of each test case, the test is executed, with the automation scripts setting the parameters on the BSE and managing the test device as it is programmatically controlled through the test procedures.

Figure 2:
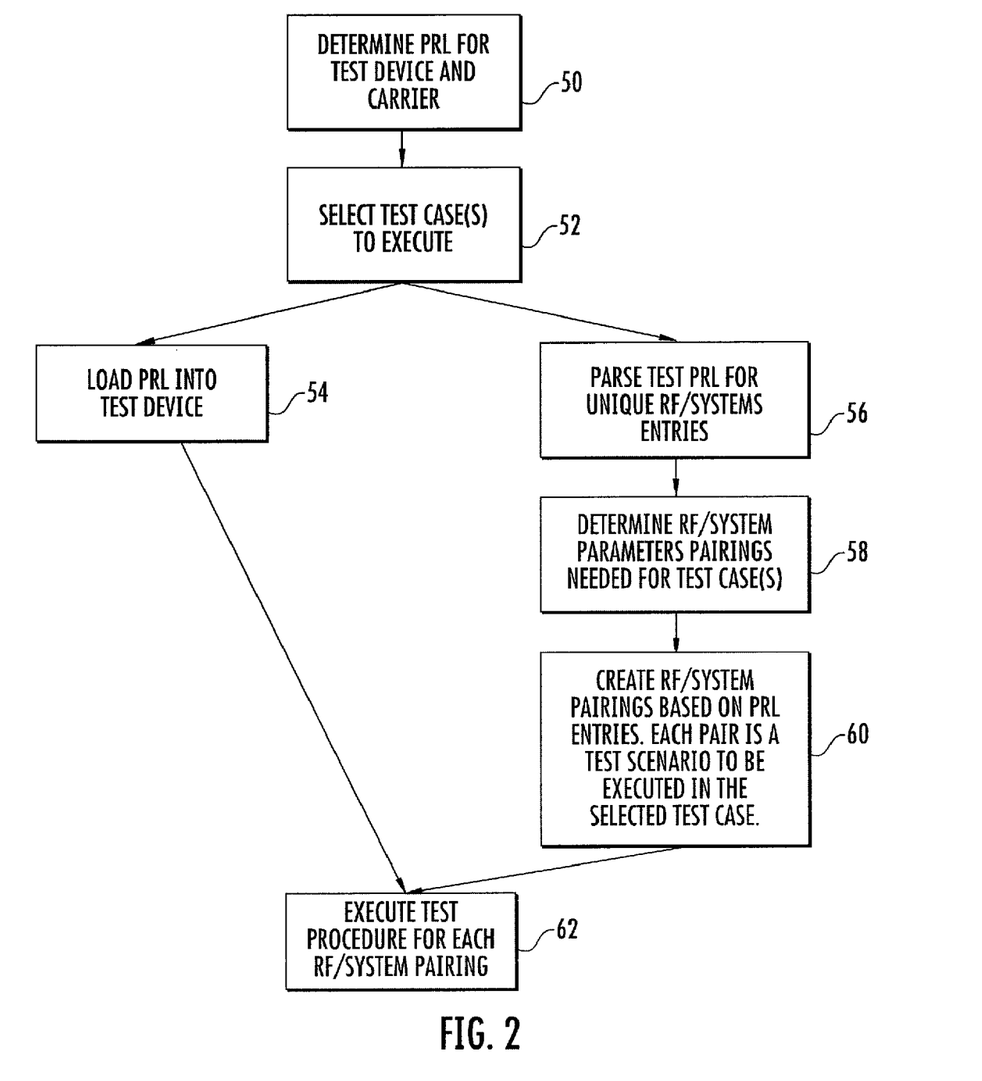
FIG. 2 is a flow diagram of the testing procedure.

FIG. 2 provides a simplistic flow diagram of the testing procedure. The PRL file is determined for each test device and carrier 50. The Test case(s) are selected for execution 52. In one test case, the PRL file is loaded into a test device 54, and the test executed 56. Alternatively a PRL test is performed for unique RF/systems entries 56. Determination of the RF/system parameters pairings needed for test cases are made 58. Creation of RF/systems pairings based on PRL entries is made 60. The test is executed for each RF/system pairing 62

EXAMPLE

The following illustrate how the process will work for sample PRL 12345.

1) Test PRL

| ROAMING LIST | |
|---|---|
| Roaming List Type: | IS-683A |
| Preferred Only: | FALSE |
| Default Roaming Indicator: | 71 |
| Preferred List ID: | 12345 |

| Acquisition Table | | | | | | | | |
|---|---|---|---|---|---|---|---|---|
| INDEX | ACQ TYPE | CH1 | CH2 | CH3 | CH4 | CH5 | CH6 | CH7- |
| 0 | 4 | B | | | | | | |
| 1 | 4 | A | | | | | | |
| 2 | 1 | B | | | | | | |
| 3 | 1 | A | | | | | | |
| 4 | 2 | B | Both | | | | | |

| System Table | | | | | | | |
|---|---|---|---|---|---|---|---|
| INDEX | NEG/ PREF | GEO | PRI | ACQ IND | ROAM IND | SID | NID |
| 0 | Pref | New | Same | 1 | 64 | 8 | 65535 |
| 1 | Pref | Same | More | 3 | 0 | 250 | 65535 |
| 2 | Pref | Same | Same | 3 | 2 | 56 | 65535 |
| 3 | Pref | Same | Same | 2 | 64 | 18 | 65535 |
| 4 | Pref | New | Same | 1 | 64 | 119 | 65535 |

2) Test Case—Rescan

This test verifies the rescan functionality. Rescan tests that once a device acquires a system and a more preferred system is presented, the device will acquire the more preferred system during the rescan process. This test only evaluates systems in the same GEO.

3) Create RF/System Pairs

The test plan calls for pairs which are in the same GEO and where the second set of RF parameters is of higher priority than the first. In this PRL indices 0-3 are in the same GEO. Indices 0, and 1 are of the same priority. Index 2 and 3 are of the same priority to each other, but both are of lesser priority than indices 0 and 1. Index 4 is of a different GEO. From these relationships we get the following pairs of RF parameters for the test.

|        | INDEX | NEG/PREF | GEO  | PRI  | CHN IND | ROAM IND | SID | NID   |
|--------|-------|----------|------|------|---------|----------|-----|-------|
| Pair 1 | 1     | Pref     | Same | Same | 3       | 0        | 250 | 65535 |
|        | 3     | Pref     | Same | Same | 2       | 64       | 18  | 65535 |
| Pair 2 | 0     | Pref     | New  | Same | 1       | 64       | 8   | 65535 |
|        | 3     | Pref     | Same | Same | 2       | 64       | 18  | 65535 |
| Pair 3 | 1     | Pref     | Same | Same | 3       | 0        | 250 | 65535 |
|        | 2     | Pref     | Same | More | 3       | 2        | 56  | 65535 |
| Pair 4 | 0     | Pref     | New  | Same | 1       | 64       | 8   | 65535 |
|        | 2     | Pref     | Same | More | 3       | 2        | 56  | 65535 |

4) Test Execution

Each of the test pair created in step 3 will be set on the BSE and the performance of the device under test will be measured according to the procedures and expected results in the test procedure document.

From this example it should be clear that as the entries in the test PRL change, the pairs used for testing will also change. The unique feature of our testing approach is that the test software will automatically adapt to the different PRL files and modify each test scenario that is executed for each test case based on the differences.

APIs are used to create dynamically all the possible test scenarios that can be found in a PRL for any given test case. The test employs the appropriate APIs for automation.

Test Scenarios:

The following outlines test cases for 1X and 1xEV-DO System Determination. These tests are executed on the 1X mode for the device being tested.

Acquisition—This test verifies the device's ability to acquire any non-negative system listed in the test PRL. The procedure tests all entries independent of priority or GEO. Once the device acquires the system, MO and MT call processing is tested.

Available System—This test verifies the device's ability to acquire a system that is not explicitly listed in the PRL. The test picks a unique channel from the acquisition table and associates it with a SID not in the PRL.

Negative System—This test verifies the device's ability to not acquire a system designated with negative priority in the PRL. The test will also cover E911 call processing where the system should be acquired and the call should be processed.

Rescan—This test verifies the rescan functionality. Rescan tests that once a device acquires a system and a more preferred system is presented, the device will acquire the more preferred system during the rescan process. This test only evaluates systems in the same GEO.

Silent Redial—This test verifies the device's ability to call process using the Silent Redial algorithm. This test verifies the device's ability to redial on systems with the same, lower or higher priority in the same GEO.

PRL Uploading Test—This test verifies the device can receive and update the PRL on the phone when a PRL of size less than maximum, at maximum, greater than maximum size is uploaded. An IS-683A formatted PRL is tested. Upload using OTASP and PST is verified.

Global Service Redirect—This test verifies if the device can be re-directed to a second base station using the GSRM protocol. The redirection should be to a system that is of equal, lesser or greater priority. Also it verifies redirection using the SRM and EGSRM protocol Custom Channel Test—This test verifies the device's ability to acquire a custom cellular channel from a standard preferred cellular channel, if any are listed in the PRL. It then tests if the handset can move back to a more preferred standard Preferred Cellular Channel.

Registration Lost During Idle State—This test verifies the device's ability to acquire a system that is of equal, lower or higher priority after the losing the current system in idle state.

Registration Lost During Traffic State—This test verifies the device's ability to acquire a system that is of equal, lower or higher priority after the losing the current system in traffic state.

Deep Sleep—This test verifies the device's ability to go into deep sleep after 15 minutes once the current system is switched off. While in deep sleep, the device wakes up every 3 minutes to scan for an available system. This test is conducted for one entry in each GEO in the PRL.

Most Recently Used—This test verifies the device's ability to acquire a system that is listed at the bottom of the GEO and the channel is listed in the MRU table.

Wildcard System ID—This test verifies the device's ability to acquire a wildcard system listed in the PRL, if any are listed in the PRL.

Rescan to Different GEO—This test verifies the device's ability to rescan to a system on a different GEO.

Max Access Probes—This test verifies the device's ability to register on a new system after receiving Max Access Probes exit from the current system. It verifies the device can register on a system with the same, lower, higher priority or available system in the same GEO.

Idle Handoff—This test verifies the device's ability to hand off to a new system from a current system.

Emergency Call on Negative System—This test verifies the device's ability complete an E911 call when no service is available and only a negative system is preset, when the device is registered on a most preferred system but fails to connect and a negative system is preset.

OTASP Dialing—This test verifies the device's ability to complete an OTASP call on the appropriate system when a particular number is dialed (e.g.*22800, *22801 etc.,), with the SPC set to either all zeros or non-zeros and MRU being either empty or not empty.

Acquisition Match Only—This test verifies the device ability to acquire a system with a channel of the same band class with the SID listed in the PRL but no system table match. The test also verify the device ability to do a proper rescan exit.

Call Release Scan—This test verifies the device's call release behavior from a most preferred system, a less preferred redirected system, and after HHO.

NDSS Behavior—This test verifies the device's behavior during Network Driven System Selection to a different type system and band class.

Cam Behavior—This test verifies the device's behavior during Channel Assignment Messaging to different channels and band classes.

Hashing Behavior—This test verifies the device's behavior during hashing on a valid and invalid channel.

Enhanced PRL Testing—This test verifies registration and international roaming based on MCC, MNC fields in the PRL.

Adversarial Conditions—This test verifies the handset behavior during adverse conditions such as handoffs, re-direction, max access probes, E911 etc.

1XEV-DO Testing—The test cases in this section should be run on 1xEV-DO devices set to the hybrid mode.

Hybrid Mode Acquision—This test verifies the device's ability to register on a 1X system and open session on all collocated EVDO systems. If an entry has no collocated system, the test evaluates only the registration, voice call and data call on the 1X system. However an EVDO system is available, voice calls are verified on 1X system and data call on the EVDO system.

Negative Systems—This test verifies the device's behaviors on negative systems when operating in Hybrid mode. If applicable the following scenarios are verified from the PRL:
  Preferred 1X system with a Negative EVDO system
  Negative 1X system with a Preferred EVDO system
  Negative 1X system with a Negative EVDO system Available System—Available System tests the device's ability to acquire a system that is not explicitly listed in the PRL. The test picks a unique channel from the acquisition table and associates it with a SID not in the PRL.

Rescan—This test verifies the rescan functionality. Rescan tests that once a device acquires a system (1X and or EVDO) and a more preferred system (1X and or EVDO) is presented, the device will acquire the more preferred system during the rescan process. This test only evaluates systems in the same GEO.

Silent Redial—This verifies the device's ability to call process using the Silent Redial algorithm. This test verifies the device's ability to redial on systems with the same, lower or higher priority in the same GEO.

Receiving a Call during a Data Session—This test verifies the device's ability to monitor the 1X paging channel and receives a phone call, while in a data call with the EVDO system.

System Acquisition During Traffic State—This test verifies the devices' ability to satisfy the following hybrid mode system access requirements:
  EVDO acquisition not allowed when in traffic state on 1X;
  1X acquisition allowed when device has active EVDO session.

PRL Upload Test—The test verifies if the device can receive and update the PRL on the phone when a PRL of size less than maximum, at maximum, greater than maximum allowed size is uploaded. The test uses an IS 683C formatted PRL. Upload using OTASP and PST is verified.

Global Redirect in hybrid mode—This test verifies the device's ability to be re-directed to a second 1X base station using the GSRM protocol. After re-directing the 1X mode, the EVDO registration also moves to a collocated system with the new 1X signal. The testing is conducted for all collocated systems for a given 1X system to all collocated systems associated with the redirected system. The redirection is to a system of equal, lesser or greater priority.

Custom Channel—This test verifies the device's ability to acquire a custom cellular channel from a standard preferred cellular channel, if any listed in the PRL. It then tests if the device can move to back to a more preferred standard Preferred Cellular Channel.

Registration Lost During Idle State—This test verifies if either the 1X or collocated EVDO signal is lost, the device can:
  Acquire an equal priority Collocated 1X or EVDO system;
  Acquire a higher priority Collocated 1X or EVDO system;
  Acquire a lower priority Collocated 1X and EVDO system.

Registration Lost During Traffic State—This test verifies the devices ability to re-acquire either a 1X or EVDO signal if either the 1X or EVDO signal is lost during a traffic state. If the EVDO signal is lost, the procedure expects the device to re-acquire a collocated system. If the 1X system is lost and a higher or lower 1X signal is provided, the device should register on the new 1X system along with its new collocated EVDO system.

Deep Sleep—This test verifies the device's ability to go into deep sleep after 15 minutes once the current system is switched off. While in deep sleep, the device wakes up every 3 minutes to scan for an available system. This test is conducted for one entry in each GEO in the PRL. The test covers the following scenarios:
  Both 1X and EVDO go into deep sleep. Device re-acquires 1X and EVDO systems when it wakes up.
  1X goes into deep sleep, device stays on collocated EV. Device re-acquires collocated 1X system when it wakes up.
  EVDO goes into deep sleep, device stays with collocated 1X. Device re-acquires collocated EVDO system when it wakes up.

Most Recently Used—This test verifies the device's ability to acquire a 1X system along with its collocated EVDO system that is listed at the bottom of the GEO and the channel is listed in the MRU table.

Wildcard System ID—This test verifies the device's ability to acquire a wildcard system listed in the PRL, if any in the PRL.

Rescan to Different GEO—This test verifies the device's ability to rescan to systems on a different GEO.

Max Access Probes—This test verifies the device's ability to register on a new system after receiving Max Access Probes exit from the current system. It verifies the device can register on systems with the same, lower, higher priority or available system in the same GEO.

Idle Handoff—This test verifies the device's ability to hand off to a new system from a current system.

Emergency Call on Negative System—This test verifies the device's ability complete E911 call when no service is available and only a negative system is preset, when the device is registered on a most preferred system but fails to connect and a negative system is preset. If applicable the following scenarios are verified from the PRL:
  Negative 1X system with a Preferred EVDO system
  Negative 1X system with a Negative EVDO system OTASP Dialing—This test verifies the device's ability to complete an OTASP call on the appropriate system when particular number is dialed for (*22800, *22801 etc.,), with SPC set to either all zeros or non-zeros and MRU being empty or not empty.

Acquisition Match Only—This test verifies the device ability to acquire a system with a channel of the same band class with the SID listed in the PRL but no system table match. The test also verify the device ability to do a proper rescan exit.

Call Release Scan—This test verifies the device's call release behavior from most preferred system, less preferred redirected system, and after HHO.

NDSS Behavior—This test verifies the device's behavior during Network Driven System Selection to different type system and band class.

Cam Behavior—This test verifies the device's behavior during Channel Assignment Message to different channels and band class.

Hashing Behavior—This test verifies the device's behavior during hashing on a valid and invalid channel.

Enhanced PRL Testing—This test verifies registration and international roaming based on MCC, MNC fields in the PRL.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. An automated testing method for system acquisition of PRL files used in all versions of CDMA and EVDO RF wireless communications comprising the steps of:

specifying a PRL file and loading said PRL file into a device to be tested;

categorizing the relationship between PRL entries having the same geographical area by determining the relationships between different PRL entries to generate system definitions from the group of Home Systems, Preferred Systems, Negative Systems, Available Systems, Systems with Equal priority in the given GEO, Systems of Lesser Priority in the given GEO, Systems of Higher Priority in the given GEO, Systems in different GEO, Collected Hybrid systems and Non collocated systems;

validating the PRL for accuracy;

generating required test conditions for base station emulation hardware;

selecting of a test scenario for said device to be tested;

creation of RF conditions by said base station emulation hardware based on said PRL file and extracting parameter information from said PRL file;

executing said test scenario;

wherein the parsing of the PRL is used to generate the required System definitions for a given scenario to verify that the performance of said device is measured against expected test results.

2. The method of claim 1 wherein said PRL files are formatted under IS683A, IS683C or IS683D standards.

3. The method of claim 1 wherein said device to be tested is a 1× based device.

4. The method of claim 1 wherein said device to be tested is a 1xEV-DO based device.

5. The method of claim 1 wherein said step of selecting of a test scenario adapts to a changed PRL and automatically modifies test parameters.

* * * * *